United States Patent
Baumann et al.

(10) Patent No.: US 8,764,303 B2
(45) Date of Patent: Jul. 1, 2014

(54) ROLLING-ELEMENT BEARING COMPRISING A FLANGE

(75) Inventors: Jens Baumann, Schweinfurt (DE); Lothar Spitzmüller, Friesenheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 95 days.

(21) Appl. No.: 13/012,525

(22) Filed: Jan. 24, 2011

(65) Prior Publication Data

US 2011/0206309 A1  Aug. 25, 2011

Related U.S. Application Data

(63) Continuation of application No. PCT/EP2009/058968, filed on Jul. 14, 2009.

(30) Foreign Application Priority Data

Jul. 25, 2008 (DE) .......................... 10 2008 034 627

(51) Int. Cl.
 *F16C 13/00* (2006.01)
 *F16D 11/00* (2006.01)

(52) U.S. Cl.
 USPC ...................................... 384/544; 192/110 B

(58) Field of Classification Search
 USPC .......... 192/110 R, 110 B; 384/445, 456, 490, 384/510, 513, 515, 535, 542, 543, 544
 See application file for complete search history.

(56) References Cited

U.S. PATENT DOCUMENTS

| | | | | |
|---|---|---|---|---|
| 4,732,250 | A * | 3/1988 | Maucher et al. | 192/70.17 |
| 5,160,007 | A * | 11/1992 | Reik et al. | 192/70.17 |
| 6,065,879 | A * | 5/2000 | Mitsue et al. | 384/448 |
| 7,966,817 | B2 * | 6/2011 | Schenck et al. | 60/624 |
| 8,162,117 | B2 * | 4/2012 | Reimnitz | 192/48.8 |
| 2003/0024788 | A1 * | 2/2003 | Damm et al. | 192/48.91 |
| 2005/0018939 | A1 * | 1/2005 | Niwa et al. | 384/544 |
| 2005/0279604 | A1 * | 12/2005 | Vetter et al. | 192/48.8 |
| 2006/0065503 | A1 * | 3/2006 | Cherry et al. | 192/3.63 |
| 2006/0151278 | A1 * | 7/2006 | Settineri | 192/91 A |
| 2006/0163019 | A1 * | 7/2006 | Feldhaus et al. | 192/48.8 |
| 2006/0289263 | A1 * | 12/2006 | Friedmann et al. | 192/48.8 |

FOREIGN PATENT DOCUMENTS

| | | |
|---|---|---|
| DE | 200 16 713 U1 | 1/2001 |
| DE | 10 2005 014 916 A1 | 10/2006 |
| EP | 1 632 687 A2 | 3/2006 |
| EP | 1 681 481 A1 | 7/2006 |
| JP | 2003 025803 A | 1/2003 |
| WO | 99/02873 A1 | 1/1999 |

\* cited by examiner

*Primary Examiner* — Alan B Waits
(74) *Attorney, Agent, or Firm* — Lucas & Mercanti, LLP

(57) ABSTRACT

A rolling-element bearing which has at least one inner ring and at least one outer ring. A relative movement is possible between the outer ring and the inner ring, and the at least one outer ring having has at least one flange for fastening to a rotatable component.

12 Claims, 4 Drawing Sheets

ROLLING-ELEMENT BEARING COMPRISING A FLANGE

This application is a continuation application of PCT/EP2009/058968 filed Jul. 14, 2009, which in turn claims the priority of DE 10 2008 034 627.6 filed Jul. 25, 2008, the priority of both applications is hereby claimed and both applications are incorporated by reference herein.

FIELD OF THE INVENTION

The present invention relates to a rolling bearing having a flange, in particular a rolling bearing having at least one inner ring and at least one outer ring, a relative movement being possible between the at least one outer ring and the at least one inner ring, and the at least one outer ring comprising at least one flange for fastening to a rotatable component.

BACKGROUND OF THE INVENTION

Rolling bearings are used, among other things, for the bearing and support of clutch units, for example in dry-plate clutches, or as transmission bearings. Here separate connection and retaining devices, such as bearing carriers, for example, are generally needed in order to fasten the rolling bearings to other components, such as rotatable clutch plates, for example, or a stationary housing. The rolling bearings generally comprise an inner ring and an outer ring and rolling elements arranged between these rings, the rolling elements rolling on bearing surfaces of the inner ring and the outer ring, so that a relative movement between the outer ring and the inner ring is possible.

The use of separate clutch plates and separate bearing carriers, however, requires additional fitting of these components to the rolling bearing. The rolling bearing and the clutch plate or the rolling bearing and the bearing carrier therefore first have to be assembled in an initial operation, before the rolling bearing can be fitted in subsequent operations. In addition, such a design requires a suitable connection of the components to the inner ring or the outer ring, which, due to the space taken up by this connection, however, and the generally very restricted overall space of such rolling bearings means that the entire rolling bearing has to be made smaller or that smaller rolling elements have to be used. Their support force and durability are thereby reduced. In addition, the small overall space means that the rolling bearing is capable of affording only a small space for lubricants. As a result this lubricant space can only accommodate an insufficient quantity of lubricant, so that a required service life of the lubricant or grease cannot be achieved.

Due in particular to the confined overall space, fastening the bearing carrier to the outer ring of the rolling bearing is therefore used in existing bearings, allowing the bearing carrier to provide a flange for fastening the rolling bearing to a stationary component. Accordingly the clutch plate is generally fastened to the inner ring.

DE 10 2005 014 916 A1 discloses a radial bearing for a vehicle drive shaft. This comprises a radial bearing, on an outer ring of which a separate retaining element or bearing carrier impinges. The retaining element comprises a flange for fastening the radial bearing, the outer ring being held in the retaining element in such a way that the radial bearing can be self-centering.

The publication DE 200 16 713 U1 discloses a bearing arrangement, which comprises a rotatable inner ring having a flange connected to a printing press roller. The associated outer ring likewise comprises a flange, which is attached to a stationary housing.

OBJECT OF THE INVENTION

The object of the invention is to overcome the disadvantages of the state of the art mentioned. In particular the intention is to facilitate assembly and to make good use of the overall space available, so that larger rolling bearings can be used. The intention in this is also to afford the greatest possible space for the accommodation of lubricants, so that a simple, reliable and cost-effective bearing design can be achieved.

SUMMARY OF THE INVENTION

The object of the invention is achieved by a rolling bearing as claimed in claim 1.

Accordingly, the rolling bearing comprises at least one inner ring and at least one outer ring, a relative movement being possible between the outer ring and the inner ring, and the at least one outer ring comprising at least one flange for fastening to a rotatable component. The concept of a "stationary" and a "rotatable" component is hereinafter in each case to be interpreted in respect of the associated vehicle or transmission and describes a corresponding movement relative to this.

According to one embodiment at least the one flange is embodied as a clutch plate. For this purpose the flange may comprise contact surfaces, which bear against a component connected to the flange, so that a rotational movement can be transmitted between the flange and the component. In this case the axis of rotation of the flange and an axis of rotation of the component are identical.

In addition, the at least one inner ring comprises at least one fastening flange for fastening the at least one inner ring to a stationary component. A corresponding design of the inner ring is represented in even more detail below.

Furthermore, the at least one flange of the outer ring can be firmly connected to the at least one outer ring. In addition, the flange, for firm connection, may be integrally formed with the at least one outer ring. The outer ring and the flange therefore form a solidly cohesive component. Elaborate, loose connection of individual components taking up overall space, with overlapping or connecting elements between the flange and the outer ring of the rolling bearing, as occur in the connection of the outer ring to a separate clutch flange, for example, can be avoided. Instead of this the outer ring and the flange can be integrally formed together, for example by drawing or casting. A suitable method of connection, such as welding, for example, can likewise be used in order to fasten the flange to the outer ring.

Furthermore, the at least one flange may be cold-formed or forged with the outer ring.

According to a further embodiment, the at least one flange is formed circumferentially on the outer ring. The flange and the outer ring therefore form an identical cross section at any position in the circumferential direction of the outer ring, so that the outer ring forms a uniform geometrical solid of revolution with the flange. The flange, for example, extends in a radial direction away from the outer ring, so that a substantially L-shaped or T-shaped cross section is produced. The outer ring and the flange here each form one leg of the respective cross section. Other suitable cross sectional shapes and orientations of the legs are naturally also possible.

According to a further embodiment, the at least one flange is formed on at least a sub-segment of the outer ring. Accordingly, the circumferential flange of the outer ring described above may be interrupted in some segments or may be arranged or formed only on partial areas of the outer ring, so that the flange forms a tie piece, which is fastened to the outer ring or connected to the latter. Here, any number of individual flanges or tie pieces, which extend outwards from the outer ring in a radial direction, for example, may be arranged running around the outer ring in a circumferential direction.

According to another embodiment, the at least one flange comprises fastening devices for fastening the flange to the rotatable, rotatable component connected to the flange.

The flange, for example, comprises recesses or bores for receiving bolts or other means of connection, in order to fasten the flange or the entire rolling bearing to the rotatable component which connects to the flange.

The rolling bearing itself may be embodied, for example, as a deep-groove ball bearing, a four-point contact ball bearing or an angular-contact ball bearing.

Furthermore, the flange may comprise means of centering. These means of centering may comprise lugs or other suitable devices, for example, which allow precise centering of the rolling bearing when fastening the flange to the rotatable component. These interact with corresponding recesses of the component and therefore ensure a precise and true seating of the rolling bearing and accordingly a correct alignment of its axis of rotation.

According to a further embodiment, the rolling bearing (1) may be designed to support a clutch unit or for use as a support bearing in dual clutch transmissions. It is therefore possible to use the rolling bearing to support a clutch unit or as support bearing in dual clutch transmissions.

According to an embodiment described above the rolling bearing, in addition to the outer ring with flange, also comprises at least one inner ring having at least one fastening flange for fastening the at least one inner ring to a stationary component.

The following embodiments of the inner ring here can be combined in any manner with the embodiments of the outer ring described above.

According to one embodiment the at least one fastening flange of the inner ring is firmly connected to the at least one inner ring. In addition, the fastening flange, for firm connection, may be integrally formed with the at least the one inner ring.

The inner ring and the fastening flange in both embodiments therefore form a solidly cohesive component. Elaborate, loose connection of individual components taking up overall space with overlapping or connecting elements between the fastening flange and the inner ring of the rolling bearing, as occur with the use of bearing carriers, can be avoided. Instead of this, the inner ring and the fastening flange can be integrally formed together, for example, by drawing, cold-forming, forging or casting. A suitable method of connection, such as welding, for example, can likewise be used in order to fasten the fastening flange to the inner ring.

In addition, the at least one fastening flange may be formed circumferentially on the inner ring.

The fastening flange and the inner ring therefore form an identical cross section at any position in the circumferential direction of the inner ring, so that the inner ring with the fastening flange forms a uniform geometrical body of revolution. The fastening flange, for example, extends in a radial direction away from the inner ring, so that a substantially L-shaped cross section is produced. The inner ring and the fastening flange here each form one leg of the L-shaped cross section. Other suitable cross sectional shapes and orientations of the legs are naturally also possible.

According to a further embodiment, the at least one fastening flange is formed on at least one sub-segment of the inner ring.

Accordingly, the circumferential fastening flange described above may be interrupted in some segments or may be arranged or formed only on partial areas of the inner ring, so that the fastening flange forms a tie piece, which is fastened to the inner ring or connected to the latter. Here any number of individual fastening flanges or tie pieces, which extend outwards from the inner ring in a radial direction, for example, may be arranged running around the inner ring in a circumferential direction.

In addition, the at least one fastening flange may comprise at least one centering lug for centering of the rolling bearing.

Accordingly, the fastening flange may comprise lugs or other suitable devices, which allow precise centering of the rolling bearing when fastening to other components, such as the stationary housing, for example. These interact with corresponding recesses of the component and therefore ensure a precise and true seating of the rolling bearing and accordingly, a correct alignment of its axis of rotation.

According to a further embodiment, the at least one fastening flange comprises recesses for fitting seals of the rolling bearing.

Fitting may be performed in such a way, for example, that at least one seal facing the fastening flange is first fitted on the fastening flange or the inner ring and the remaining components such as rolling elements, further seals and the outer ring are then added. In order to create suitable access for fitting the rolling bearing and insertion of the seals, despite the fastening flange, the recesses may be arranged at suitable points in the fastening flange. The recesses may allow a radial or axial offset of the seals for pre-fitting to the fastening flange. In addition, fitting recesses may be provided in the fastening flange for fitting of the seal, particularly in order to assist insertion of the seal facing the fastening flange and to afford access to this seal. The fitting recesses moreover facilitate assembly of the entire rolling bearing. The outer ring can naturally also, like the inner ring, be designed with corresponding recesses to facilitate fitting of the rolling bearing.

Furthermore, the fastening flange may comprise fastening devices for fastening the inner ring to the stationary component.

For example, the fastening flange comprises recesses or bores for receiving bolts or other means of connection, in order to fasten the fastening flange or the entire rolling bearing to the stationary housing.

According to another embodiment, the seals of the rolling bearing are embodied as single or double seals. Naturally other suitable devices can also be used for sealing the rolling bearing.

BRIEF DESCRIPTION OF THE DRAWINGS

The invention is explained in more detail below with reference to exemplary embodiments. In the associated drawings.

DETAILED DESCRIPTION OF THE DRAWINGS

Figure 1:
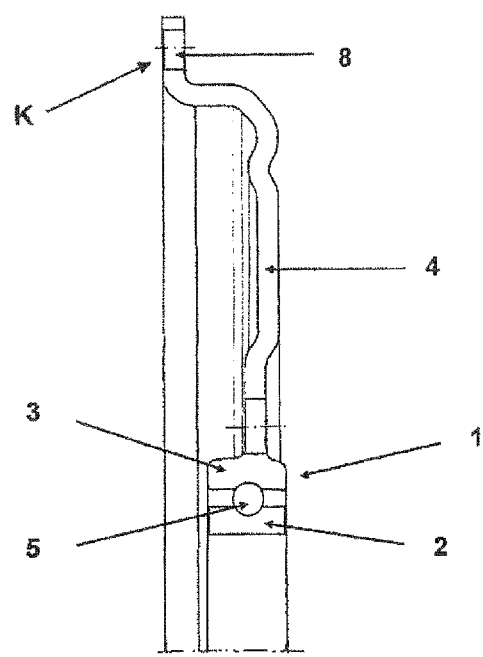
FIG. 1 shows a cross section through the rolling bearing described with flange on an outer ring.

FIG. 1 shows a cross section through a rolling bearing 1 having a flange 4 and substantially comprising an inner ring 2 and an outer ring 3 and rolling elements 5 arranged between these. The flange 4 is integrally formed with the outer ring 3 and extends substantially away from the outer ring 3 in a radial direction of the rolling bearing 1. In the embodiment shown the flange 4 constitutes a clutch plate and is embodied as a plate-shaped disk or plate, which has a contact surface K. In addition the flange 4 has fastening devices 8, which comprise bores for receiving connection bolts (not shown).

Figure 2:
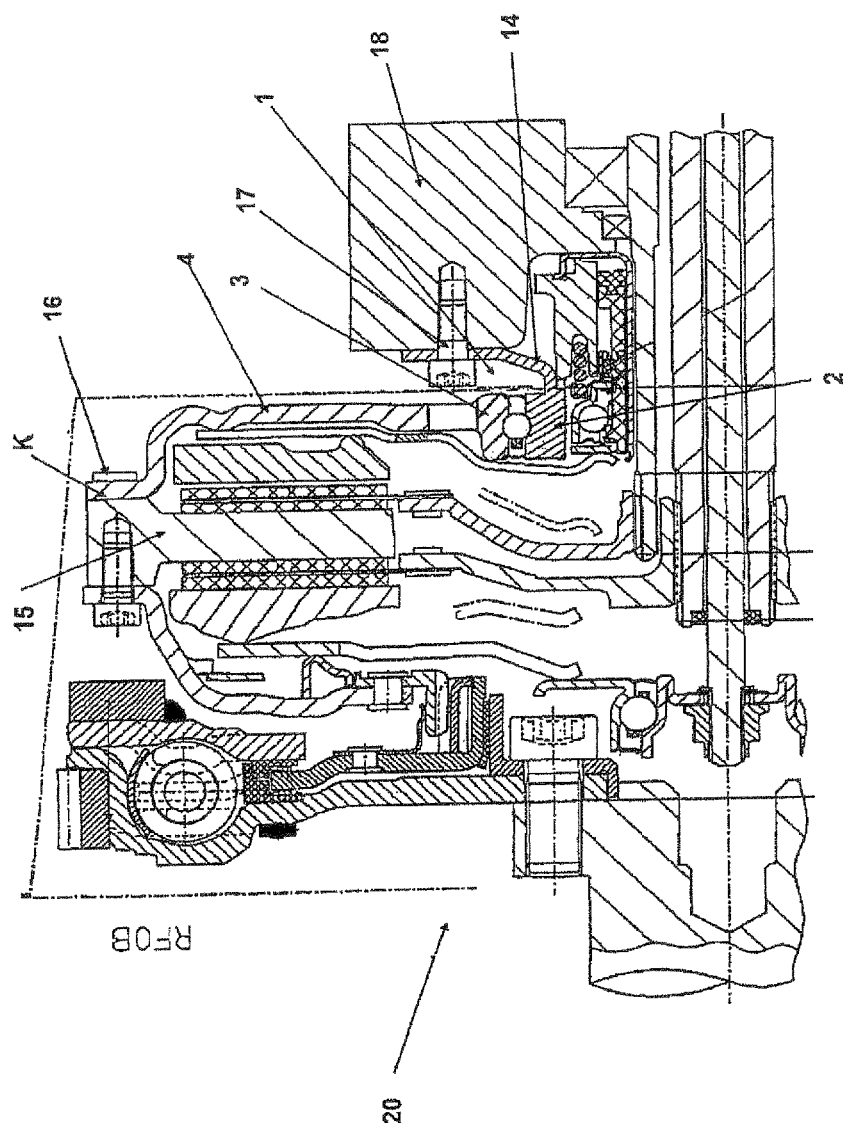
FIG. 2 shows a cross section through a transmission with a rolling bearing in the fitted state.

FIG. 2 shows a cross section through a transmission 20, which comprises the with the rolling bearing 1 described with the flange 4 on the outer ring 3 and a fastening flange 14 on an inner ring 2, in the fitted state. Here the flange 4, which constitutes a clutch plate, is connected at the contact surface K to a further rotatable component 15 by means of bolts 16. In addition, the fastening flange 14 of the inner ring 2 is fastened by means of bolts 17 to a wall 18 to be assigned to a housing. Both flanges 4, 14 are therefore in immediate or direct contact with the respective adjoining component 15, 18, so that no separate connecting elements or adapters need to be used.

Figure 3:
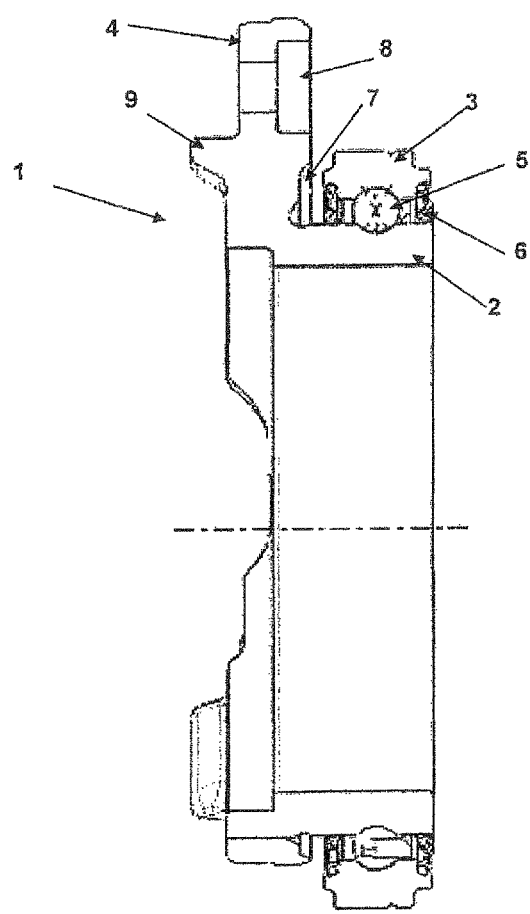
FIG. 3 shows a cross section through the rolling bearing described with fastening flange on an inner ring.

FIG. 3 shows a cross section through a rolling bearing 1 having a fastening flange 14, which substantially comprises an inner ring 2 and an outer ring 3 and rolling elements 5 arranged between these. The rolling elements 5 are sealed off from the surroundings by seals 6, which are represented as single seals. Other suitable seals and ones known to the person skilled in the art are naturally also feasible. In the embodiment shown the fastening flange 14 is integrally formed with the inner ring 2 and extends at right angles from the latter in a radial direction. The inner ring 2 and the fastening flange 14 here form an L-shaped cross sectional shape. A centering lug 9, which ensures a precise centering of the entire rolling bearing 1 when fitting the fastening flange 14 to a stationary component (not shown), is arranged on an outer surface or end face of the fastening flange 14. The centering lug 9 here impinges on a correspondingly designed surface of the component. In addition the fastening flange 14 comprises fastening devices 8, which in the embodiment shown as a bore of stepped diameter for receiving means of fastening, such as a bolt, for example, in order to fasten the fastening flange 14 to the stationary component. The fastening flange 14 is embodied as a tie piece, which is arranged at a defined position on the inner ring 2.

In addition the fastening flange 14 comprises recesses 7, which facilitate fitting of the rolling bearing 1, particularly the seals 6.

Figure 4:
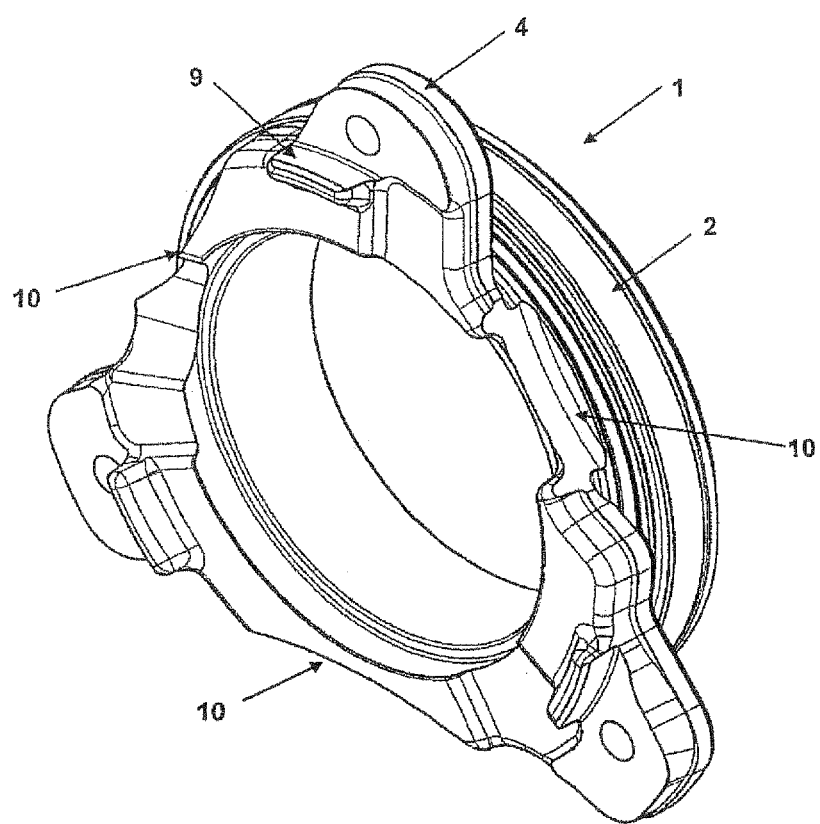
FIG. 4 shows a perspective view of a rolling bearing with flange on the inner ring according to the description.

FIG. 4 shows a further perspective view of the rolling bearing 1 described in FIG. 3 having multiple fastening flanges 14. In the embodiment shown, the rolling bearing 1 comprises three fastening flanges 14, which are arranged spaced at regular intervals from one another in a circumferential direction on a lateral face of the inner ring 2. The fastening flanges 14 extend substantially in a radial direction away from the rolling bearing 1. Each fastening flange 14 is of a locally varying thickness, which can be designed according to the anticipated loads. A constant thickness of the fastening flanges 14 is naturally also possible. In addition, each fastening flange 14 comprises a centering lug 9 for centering the fastening flange 14 or the rolling bearing 1 when fitting to the stationary component 18.

Furthermore, a number of fitting recesses 10 are shown formed on the fastening flange 14 for fitting the seal. These allow access to the seals 6 during fitting, in particular to the seal 6 facing the fastening flange 4, and facilitate assembly of the entire rolling bearing.

LIST OF REFERENCE NUMERALS

1 Rolling bearing
2 Inner ring
3 Outer ring
4 Flange
5 Rolling element
6 Seals
7 Recess
8 Fastening device
9 Centering lug
10 Fitting recess
14 Fastening flange
15 Rotatable component
16 Bolt
17 Bolt
18 Stationary component
19 Transmission
20 Contact surface

The invention claimed is:

1. A transmission or clutch including a rolling bearing, the rolling bearing comprising:
at least one inner ring and at least one outer ring, a relative movement being possible between the at least one outer ring and the at least one inner ring,
wherein the at least one outer ring is designed as a single one-piece part that includes at least one flange fastened to a rotatable component of the transmission or clutch, and
wherein the at least one inner ring is designed as a single one-piece part having a plurality of fastening flanges fastening the at least one inner ring to a stationary component, the plurality of fastening flanges being spaced at regular intervals from one another in a circumferential direction on a lateral face of the at least one inner ring, and wherein each of the fastening flanges includes an axial recess at a base of the each of the fastening flanges, the axial recess facing a space between the at least one inner ring and the at least one outer ring.

2. The transmission or clutch as claimed in claim 1, wherein the at least one flange is a clutch plate of the transmission or clutch.

3. The transmission or clutch as claimed in claim 1, wherein the at least one flange is formed circumferentially on the at least one outer ring.

4. The transmission or clutch as claimed in claim 1, wherein the at least one flange is cold-formed or forged with the at least one outer ring.

5. The transmission or clutch as claimed in claim 1, wherein the at least one flange has fastening devices for fastening the at least one flange to the rotatable component.

6. The transmission or clutch as claimed in claim 1, wherein the rolling bearing is a deep-groove ball bearing, a four-point contact ball bearing or an angular-contact ball bearing.

7. The transmission of clutch as claimed in claim 1, wherein the each of the fastening flanges comprises an axially extending centering lug on a side of the each fastening flange opposing the axial recess.

8. The transmission or clutch as claimed in claim 1, wherein the rolling bearing is designed to support a clutch unit or for use as a support bearing in dual clutch transmissions.

9. The transmission or clutch as claimed in claim 1, wherein the rolling bearing supports an input side of the clutch.

10. The transmission or clutch as claimed in claim 1, wherein the at least one flange includes a contact surface and bores, which open through the contact surface, for receiving connection bolts.

11. The transmission or clutch as claimed in claim 10, wherein the contact surface contacts a pressure plate of a clutch.

12. The transmission or clutch as claimed in claim 1, wherein the inner ring includes fitting recesses between the plurality of flanges allowing access to seals of the bearing facing the flange.

\* \* \* \* \*